United States Patent
Bae et al.

(10) Patent No.: US 11,987,681 B2
(45) Date of Patent: May 21, 2024

(54) METHODS OF MAKING ANION EXCHANGE MEMBRANE VIA SIMULTANEOUS POST-FUNCTIONALIZATION AND CROSSLINKING OF EPOXIDIZED SBS

(71) Applicants: Chulsung Bae, Cohoes, NY (US); Chang Y. Ryu, Loudonville, NY (US); Ding Tian, Troy, NY (US)

(72) Inventors: Chulsung Bae, Cohoes, NY (US); Chang Y. Ryu, Loudonville, NY (US); Ding Tian, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 126 days.

(21) Appl. No.: 17/223,544

(22) Filed: Apr. 6, 2021

(65) Prior Publication Data
US 2021/0309818 A1    Oct. 7, 2021

Related U.S. Application Data

(60) Provisional application No. 63/005,696, filed on Apr. 6, 2020.

(51) Int. Cl.
| | | |
|---|---|---|
| *C08J 5/22* | (2006.01) | |
| *B01J 41/14* | (2006.01) | |
| *B01J 47/12* | (2017.01) | |
| *C08F 293/00* | (2006.01) | |

(52) U.S. Cl.
CPC .............. *C08J 5/2287* (2013.01); *B01J 41/14* (2013.01); *B01J 47/12* (2013.01); *C08F 293/00* (2013.01); *C08J 2309/06* (2013.01)

(58) Field of Classification Search
CPC ...... C08J 5/2287; C08J 2309/06; B01J 41/14; B01J 47/12; C08F 293/00
(Continued)

(56) References Cited

U.S. PATENT DOCUMENTS

| | | | |
|---|---|---|---|
| 8,969,424 B2 | 3/2015 | Lin | |
| 9,120,893 B1 * | 9/2015 | Chandra | ................ C08G 64/24 |

(Continued)

OTHER PUBLICATIONS

Choi et al. "Preparation and characteristics of crosslinked SEBS/HIPS cation exchange membrane using epoxidized polybutadiene/divinylbenzene", Polymer (Korea) (2009), 33(6), 608-614 (Year: 2009).*

(Continued)

*Primary Examiner* — Michael M. Bernshteyn
(74) *Attorney, Agent, or Firm* — Barclay Damon LLP; Anthony P. Gangemi

(57) ABSTRACT

An anion exchange membrane is provided by converting carbon-carbon double bonds in the backbone of polystyrene-block-polybutadiene-block-polystyrene (SBS) into epoxide groups. Unmodified SBS is first partially hydrogenated to remove about 65% to about 90% of carbon-carbon double bonds. The remaining double bonds are then converted to epoxide groups to form an epoxidized SBS. UV-initiated ring opening reactions between the epoxidized SBS and haloalkyloxiranes are then employed to simultaneously functionalize and crosslink the epoxidized SBS. The halide groups in the crosslinked polymer network can be replaced via nucleophilic substitution to offer anion conductivity, e.g., via reaction with trimethylamine. Further ion exchange reactions can then be performed to make the membrane hydroxide conductive. The crosslinked membranes described herein exhibit a mechanical strength improvement of 200% compared to unmodified SBS, while maintaining high hydroxide conductivity. This synthetic platform is advantageous to provide mechanically robust anion exchange membranes for fuel cell applications.

20 Claims, 10 Drawing Sheets

(58) Field of Classification Search
USPC .......................................................... 521/27
See application file for complete search history.

(56) References Cited

U.S. PATENT DOCUMENTS

| | | | |
|---|---|---|---|
| 9,233,345 B2 | 1/2016 | He et al. | |
| 2011/0207028 A1* | 8/2011 | Fukuta ................. | H01M 8/103 |
| | | | 429/535 |
| 2012/0220673 A1 | 8/2012 | Browning et al. | |
| 2014/0227627 A1* | 8/2014 | He ........................ | B01D 69/02 |
| | | | 429/492 |
| 2014/0353241 A1 | 12/2014 | Yin et al. | |
| 2015/0111128 A1 | 4/2015 | Matsuda et al. | |
| 2017/0203289 A1* | 7/2017 | Bae ......................... | C08F 8/24 |
| 2018/0175354 A1 | 6/2018 | Tokushima et al. | |

OTHER PUBLICATIONS

Sepehr et al. "Mesoscale Simulation of Anion Exchange Membranes Based on Quaternary Ammonium Tethered Triblock Copolymers", Macromolecules, (2017), vol. 50, pp. 4397-4405 (Year: 2017).*

Jeon et al. "Ionic Functionalization of Polystyrene-b-poly(ethylene-co-butylene)-b-polystyrene via Friedel-Crafts Bromoalkylation and iits Application for Anion exchange membranes", ECS Transactions, (2017), vol. 80, pp. 967-970 (Year: 2017).*

Hao et al. "Crosslinked high-performance anion exchange membranes based on poly(styrene-b-(ethylene-co-butylene)-b-styrene)", Journal of Membrane Science, (2018), vol. 551, pp. 66-75 (Year: 2018).*

Choi et al. "Preparation and characteristics of crosslinked SEBS/HIPS cation exchange membrane using epoxidized polybutadiene/divinyloenzene'", Polymer (Korea) (2009) (Year: 2009).*

Sepehr et al. "Mesoscale Simulation of Anion Exchange Membranes Based on Quaternary Ammonium Tethered Triblock Copolymers", Macromolecules, (2017) (Year: 2017).*

Jeon et al. "Ionic Functionalization of Polystyrene-b-poly(ethylene-co- butylene)-b-polystyrene via Friedel-Crafts Bromoalkylation and its Application for Anion exchange membranes", ECS Transactions, (2017), vol. 80, pp. 967-970 (Year: 2017).*

* cited by examiner

METHODS OF MAKING ANION EXCHANGE MEMBRANE VIA SIMULTANEOUS POST-FUNCTIONALIZATION AND CROSSLINKING OF EPOXIDIZED SBS

CROSS REFERENCE TO RELATED APPLICATIONS

This application claims the benefit of U.S. Provisional Patent Application No. 63/005,696, filed on Apr. 6, 2020, which is incorporated herein by reference in its entirety.

STATEMENT REGARDING FEDERALLY SPONSORED RESEARCH AND DEVELOPMENT

This invention was made with U.S. Government support under Grant Number NSF 1506245 awarded by the National Science Foundation. The United States Government has certain rights in the invention.

BACKGROUND

The demand for energy has been increasing continuously with the development of human society. Traditional fossil fuels, as non-renewable energy sources, are facing exhaustion in the foreseeable future. The burning of fossil fuels is also contributing to a series of environmental and societal threats, such as green-house effects, global climate change, the displacement of individuals due to environmental concerns, etc. The research and development of alternative clean energy sources and associated systems are therefore becoming more and more important.

Fuel cells are a representative clean energy device which converts energy in its fuel directly to electricity, generating only water as a byproduct. Given that the fuel for use in fuel cells, e.g., hydrogen, is obtainable by renewable sources like solar and wind, fuel cells can be regarded as zero-emission devices. Compared to the current high-cost of proton exchange membrane fuel cells, anion exchange membrane fuel cells (AEMFC) have the potential to realize reduced cost fuel cells by using inexpensive non-platinum catalysts and enhanced cathode kinetics under basic conditions. However, a wider commercialization of AEMFC is restricted by a few challenges, most notably the lack of satisfactory anion exchange membranes (AEM), the key component of AEMFC, with suitable conductivity, alkaline stability, mechanical property, and scale-up capability.

Long-term alkaline stability of AEM material highly depends, at least in part, on the durability of polymer backbone and functional groups under high pH conditions. For example, it was found that the aryl-ether bond of polysulfone-based AEMs was susceptible to hydroxide ion attack when an electron-withdrawing functional group was in adjacent. Therefore, a polymer backbone made of all carbon linkage is preferable in AEM material design.

High hydroxide conductivity is also expected for the sake of an efficient operation of AEMFC. Ion conductivity within the membrane is related to ion exchange capacity (IEC), which is a characterization of the concentration of ionic groups within the membrane, as well as the formation of effective ion-conductive channels. However, membranes with high IEC tend to swell dramatically due to the excessive absorption of water when fully hydrated, which deteriorates the mechanical integrity of the membrane and makes it difficult to manipulate the membrane electrode assembly.

Polystyrene-b-polybutadiene-b-polystyrene (SBS) triblock copolymer has been employed as a stable membrane material due to its all-carbon backbone. Additionally, the chemically linked but phase-separated morphology of SBS has potential to help form well-connected ionic channels facilitating high conductivity. SBS provides versatility in term of post-functionalization because of the reactive site between aromatic ring in polystyrene (PS) block and carbon-carbon double bond in polybutadiene (PB) block. Research works on post-functionalization of PS block via chloromethylation, C—H borylation followed by Suzuki coupling, and acid-catalyzed Friedel-Crafts reaction have been reported. Those membranes do tend to sacrifice at least some mechanical stability after functionalization, since the PS block is no longer used as a physical crosslinker due to the plasticization effect of water after introduction of ionic functional groups.

Therefore, addition crosslinking is usually employed in an attempt to limit swelling while maintaining relatively high IEC. The most common crosslinking method is use of diamine to react with alkyl bromide. In this way, the ionic group is incorporated in the less mobile crosslinker. It was also reported that ion conductivity would benefit from the ionic groups being located on flexible side chains due to the easier ion aggregation. This is at least in part the reason why crosslinked membranes exhibit lower conductivity compared to its uncrosslinked analogue with similar IEC. However, crosslinking treatment complicates any synthetic scheme and increases the overall cost of material design.

SUMMARY

Aspects of the disclosed subject matter include an ion exchange membrane material including a polymer according to Formula I:

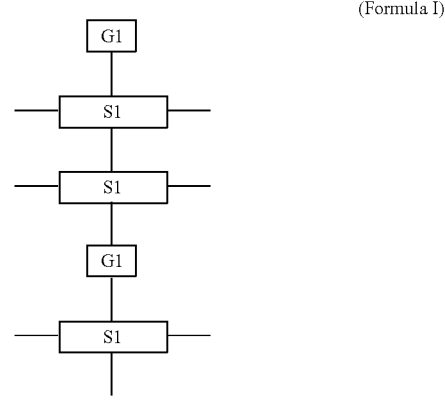

(Formula I)

In some embodiments, S1 is an epoxidized polystyrene-block-polybutadiene-block-polystyrene triblock copolymer and G1 includes one or more alkylated substrates. In some embodiments, the S1-S1 linkage is one or more ether linkages. In some embodiments, the one or more alkylated substrates are joined by ether linkages. In some embodiments, the alkylated substrates include a hydrocarbyl group and one or more ionic groups. In some embodiments, the alkylated substrate includes one or more quaternary ammonium groups, one or more multication hydrocarbyl groups, one or more halide groups, or combinations thereof. In some embodiments, the alkylated substrate includes Formula II:

Formula (II)

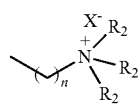

In some embodiments, $R_2$ is a hydrocarbyl group, n is about 1 to about 10, and X includes hydroxide, one or more halides, or combinations thereof. In some embodiments, the polymer includes the structure according to Formula III:

(Formula III)

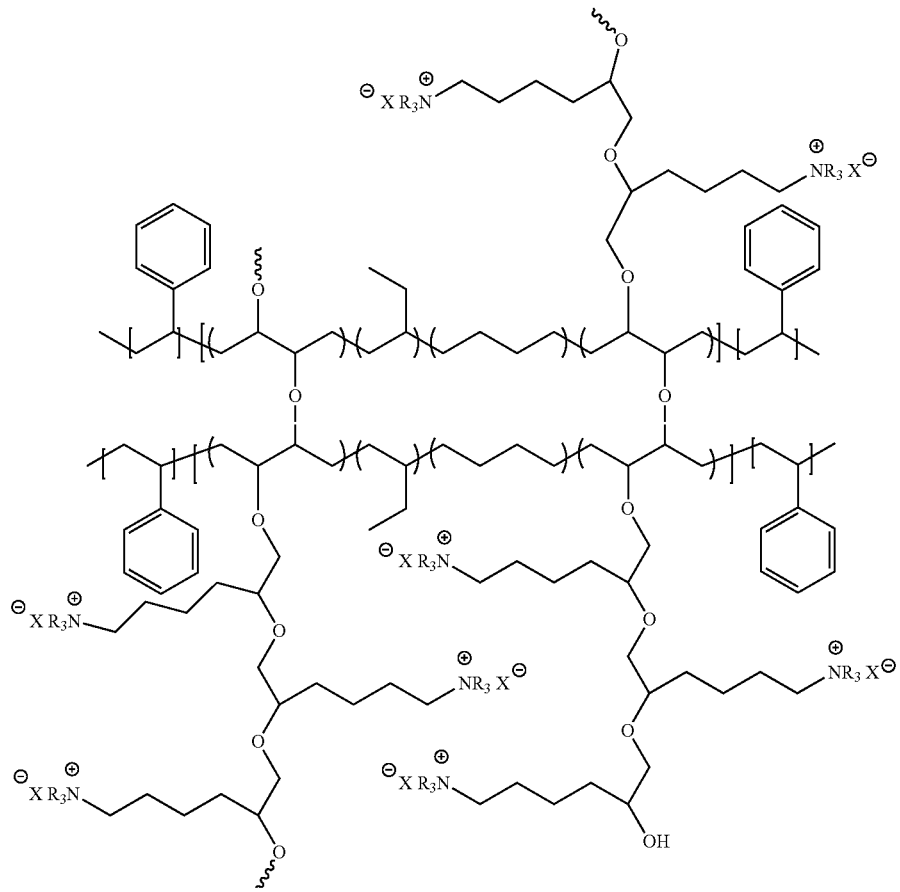

In some embodiments, R is a methyl group and X is a hydroxide.

Aspects of the disclosed subject matter include a method of making an ion exchange membrane material including providing a hydrogenation reaction medium including polystyrene-block-polybutadiene-block-polystyrene (SBS), performing a hydrogenation reaction to at least partially hydrogenate carbon-carbon double bonds in the SBS to form a hydrogenated SBS, reacting the hydrogenated SBS with an epoxidizing agent to convert carbon-carbon double bonds to epoxide groups on the hydrogenated SBS to form an epoxidized SBS, mixing the epoxidized SBS with one or more oxiranes, the one or more oxiranes substituted with one or more ionic functional groups, and exposing the mixture to a source of UV light to form a crosslinked SBS. In some embodiments, the method includes reacting the crosslinked SBS with an alkyltrialkylammonium to include a quaternary ammonium group in at least a portion of the crosslinked SBS and performing an ion exchange reaction to make the membrane hydroxide conductive.

In some embodiments, the hydrogenation reaction medium further comprises 4-methylbenzenesulfonohydrazide and tripropylamine. In some embodiments, the hydrogenation reaction removes between about 65% and about 90% of carbon-carbon double bonds in the SBS. In some embodiments, the epoxidizing agent includes a peracid, a peroxide, a peroxymonosulfuric acid, or combinations thereof. In some embodiments, the epoxidizing agent includes hydrogen peroxide, 3-chloroperoxybenzoic acid, potassium peroxymonosulfate, or combinations thereof. In some embodiments, the one or more ionic functional groups include one or more quaternary ammonium groups, one or more hydrocarbyl groups, one or more halide groups, or combinations thereof. In some embodiments, the ion exchange membrane material includes a polymer according to Formula I. In some embodiments, the polymer includes the structure according to Formula III.

Aspects of the disclosed subject matter include a method of making an ion exchange membrane including providing a hydrogenation reaction medium including a SBS, performing a hydrogenation reaction to at least partially hydrogenate carbon-carbon double bonds in the SBS to form a hydrogenated SBS, reacting the hydrogenated SBS with an epoxidizing agent to convert carbon-carbon double bonds on the hydrogenated SBS to epoxide groups to form an epoxidized SBS, mixing the epoxidized SBS with one or more haloalkyloxiranes in excess, exposing the mixture to a source of UV light to simultaneously crosslink the epoxidized SBS via one or more ether linkages and functionalize the epoxidized SBS with a plurality of halide functional groups, reacting the epoxidized SBS with an alkyltrialkylammonium to substitute at least a portion of the halide functional groups with quaternary ammonium groups, and performing an ion exchange reaction to make the membrane hydroxide conductive. In some embodiments, the hydrogenation reaction removes between about 65% and about 90% of carbon-carbon double bonds in the SBS. In some embodiments, the epoxidizing agent includes hydrogen peroxide, 3-chloroperoxybenzoic acid, potassium peroxymonosulfate, or combinations thereof. In some embodiments, the polymer includes the structure according to Formula III.

DETAILED DESCRIPTION

Figure 1:
FIG. 1 is a chart of a method of making an ion exchange membrane material according to some embodiments of the present disclosure.

Some embodiments of the present disclosure include an ion exchange membrane material including a polymer according to Formula I:

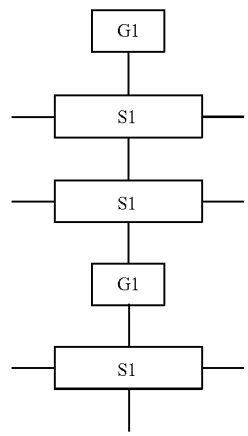
(Formula I)

In some embodiments, S1 is an epoxidized polystyrene-block-polybutadiene-block-polystyrene triblock copolymer (SBS). As used herein, the SBS is "epoxidized" in that epoxide groups are introduced to a backbone of the SBS, after which the SBS is crosslinked and functionalized as will be discussed in greater detail below. In some embodiments, the S1 blocks are crosslinked. In some embodiments, the linkages between adjacent S1 blocks, also referred to herein as "S1-S1 linkages," include one or more ether linkages. In some embodiments, the S1 blocks are crosslinked via a plurality of ether linkages. In some embodiments, G1 includes one or more alkylated substrates. In some embodiments, the alkylated substrates include a hydrocarbyl group and at least one ionic group. As used herein, the term "hydrocarbyl" is used to refer to saturated and unsaturated hydrocarbon groups including 1 or more carbon atoms. The hydrocarbyl group can be acyclic, cyclic, or combinations thereof. The hydrocarbyl group can be branched or unbranched. The hydrocarbyl group can be unsubstituted or substituted with one or more functional groups. In some embodiments, the alkylated substrate includes one or more quaternary ammonium groups, one or more multication hydrocarbyl groups, one or more halide groups, or combinations thereof. In some embodiments, the alkylated substrate includes Formula II:

Formula (II)

In some embodiments, $R_2$ is a hydrocarbyl group. In some embodiments, $R_2$ is a methyl group. In some embodiments, n is between about 1 and about 20. In some embodiments, n is between about 1 and about 10. In some embodiments, X includes hydroxide, one or more halides, or combinations thereof.

In some embodiments, the polymer includes a plurality of G1 blocks, i.e., the S1 blocks are functionalized at a plurality of locations along the length of the polymer. In some embodiments, the G1 blocks include a plurality of alkylated substrates. In some embodiments, adjacent alkylated substrates in a G1 block are joined via one or more ether linkages. In some embodiments, the linkages between S1 blocks and G1 blocks, also referred to herein as "S1-G1 linkages," include one or more ether linkages.

In some embodiments, the polymer includes the structure according to Formula III:

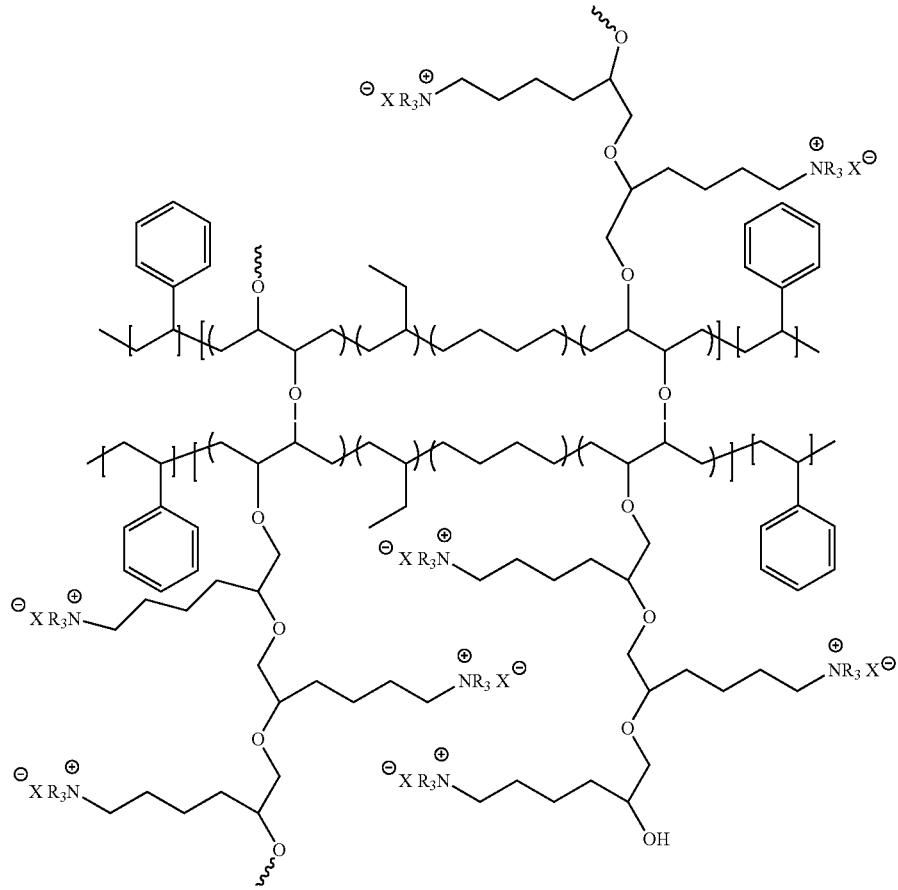

(Formula III)

In some embodiments, R is a methyl group. In some embodiments, X is a hydroxide, one or more halides, or combinations thereof. In some embodiments, X is a hydroxide. Exemplary membranes composed of the crosslinked polymers of the instant disclosure exhibited ion exchange capacity (IEC) as high as 2.69 mmol/g with hydroxide conductivity of 98 mS/cm at 80° C. and 100% relative humidity (RH). Mechanical stability was characterized by tensile tests using dynamic mechanical analysis under 50° C. and 50% RH. Compared to unmodified SBS, the tensile strength was improved by 200% while elongation at break higher than 100% was maintained. Because of the flexible, efficient, tunable, and low-cost nature of some embodiments of the technology, these polymers are suitable for use in mechanically robust anion exchange membrane materials for fuel cell applications.

Referring now to FIG. 1, some embodiments of the present disclosure are directed to a method 100 of making an ion exchange membrane material, e.g., including the polymers described above. At 102, a reaction medium including polystyrene-block-polybutadiene-block-polystyrene is provided. At 104, a hydrogenation reaction is performed to hydrogenate carbon-carbon double bonds in the SBS to form a hydrogenated SBS. In some embodiments, between about 50% and about 99% of carbon-carbon double bonds in the SBS are hydrogenated. In some embodiments, between about 60% and about 95% of carbon-carbon double bonds in the SBS are hydrogenated. In some embodiments, between about 65% and about 90% of carbon-carbon double bonds in the SBS are hydrogenated. In some embodiments, the hydrogenation reaction medium further comprises 4-methylbenzenesulfonohydrazide and tripropylamine.

At 106, the hydrogenated SBS is reacted with one or more epoxidizing agents. As discussed above, the epoxidizing agents introduce epoxide groups on the hydrogenated SBS to form an epoxidized SBS. In some embodiments, the epoxidizing agent includes a peracid, a peroxide, a peroxymonosulfuric acid, or combinations thereof. In some embodiments, the epoxidizing agent includes hydrogen peroxide, 3-chloroperoxybenzoic acid, potassium peroxymonosulfate, or combinations thereof. In some embodiments, the epoxidizing agents convert carbon-carbon double bonds on the hydrogenated SBS to epoxide groups. In some embodiments, substantially all carbon-carbon double bonds on the hydrogenated SBS are converted to epoxide groups, i.e., substantially all of the carbon-carbon double bonds have been removed, e.g., via hydrogenation or epoxidation, in the epoxidized SBS. In some embodiments, all carbon-carbon double bonds on the hydrogenated SBS are converted to epoxide groups, i.e., all of the carbon-carbon double bonds have been removed in the epoxidized SBS. In some embodiments, between about 1% and about 50% of carbon-carbon double bonds in the SBS are converted to epoxide groups in the epoxidized SBS. In some embodiments, between about 5% and about 40% of carbon-carbon double bonds in the SBS are converted to epoxide groups in the epoxidized SBS. In some embodiments, between about 10% and about 35% of carbon-carbon double bonds in the SBS are converted to epoxide groups in the epoxidized SBS.

As discussed above, the polymers according to some embodiments of the present disclosure are synthesized, in part, by introducing epoxide groups to the backbone of polystyrene-block-polybutadiene-block-polystyrene block copolymer. In some exemplary embodiments, SBS includes the structure according to Formula IV:

(Formula IV)

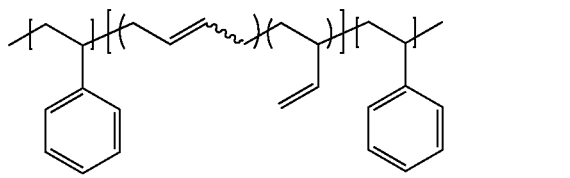

Upon partial hydrogenation, e.g., in the presence of 4-methylbenzenesulfonohydrazide and tripropylamine, at least a portion of the carbon-carbon double bonds in the SBS are converted to carbon-carbon single bonds, resulting in hydrogenated SBS, e.g., the structure according to Formula V:

(Formula V)

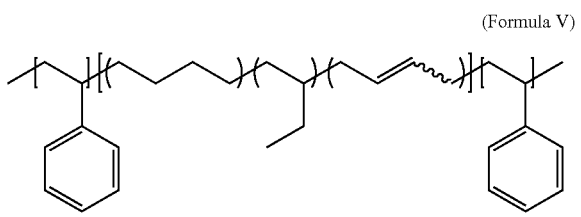

As discussed above, in some embodiments, the hydrogenation reaction removes between about 50% and about 99%; about 60% and about 95%; or about 65% and about 90% of carbon-carbon double bonds in the SBS. The remaining carbon-carbon double bonds in the hydrogenated SBS can then be converted to epoxide groups, e.g., via reaction with hydrogen peroxide, 3-chloroperoxybenzoic acid, potassium peroxymonosulfate, or combinations thereof, resulting in epoxidized SBS, e.g., the structure according to Formula VI:

(Formula VI)

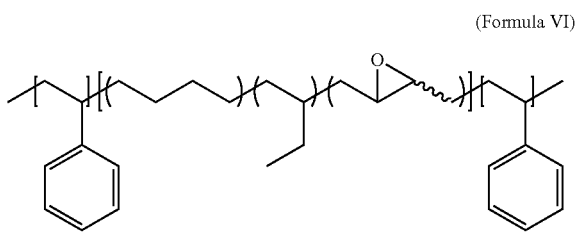

At 108, the epoxidized SBS is mixed with one or more oxiranes. In some embodiments, the one or more oxiranes are substituted with one or more ionic functional groups. In some embodiments, the one or more ionic functional groups include one or more quaternary ammonium groups, one or more hydrocarbyl groups, one or more halide groups, or combinations thereof. In some embodiments, the oxiranes include one or more haloalkyloxiranes. At 110, the mixture is exposed to a source of UV light, forming a crosslinked SBS. The source of UV light can be from any suitable natural or synthetic source. In some embodiments, exposing the mixture to UV light simultaneously crosslinks and functionalizes the epoxidized SBS to form the crosslinked SBS. Without wishing to be bound by theory, exposure of the mixture of epoxidized SBS and the oxiranes initiates cationic epoxide ring-opening polymerization between the epoxide groups in both components of the mixture. In some embodiments, the mixture includes one or more photoacid generators. In some embodiments, the photoacid generators include diaryliodonium salts, onium hexafluoroantimonate salts, etc. Without wishing to be bound by theory, the photacid generators decompose and generate superacid upon exposure of UV light, which in turn acts as a catalyst for the cationic epoxide ring-opening polymerization. If epoxide groups on the epoxidized SBS react with epoxide groups on an adjacent epoxidized polymer, the adjacent epoxidized polymers can crosslink at that location via an ether linkage, i.e., the S1-S1 linkage discussed above. If epoxide groups on the epoxidized SBS react with epoxide groups on the oxiranes, the oxiranes can be attached to the epoxidized SBS at that location via an ether linkage to functionalize the polymer, i.e., the S1-G1 linkages discussed above. The structure of the oxiranes thus enables control over functionalizing the epoxidized SBS. Exemplary embodiments of oxiranes suitable for use in ion exchange membranes include an oxirane functionalized with at least one ionic group, e.g., a halide or quaternary ammonium, tethered to the oxirane via a hydrocarbyl tether. Exemplary embodiments of the one or more oxiranes include 2-(6-bromohexyl)oxirane, 2-(4-bromobutyl)oxirane, 2-(8-bromooctyl)oxirane, etc. If epoxide groups on the epoxidized SBS react with epoxide groups of oxiranes already tethered to another epoxidized SBS, epoxidized SBS can be attached to the tethered oxiranes at that location via an ether linkage to further crosslink the polymer network of SBS, e.g., via an S1-G1-S1 linkage. In some embodiments, the combination of all of these ether linkages results in a functionalized and crosslinked polymer network, e.g., consistent with Formula III described above. In some embodiments, uncrosslinked polymer can be extracted, e.g., via washing with one or more fluids such as chloroform.

At 112, the crosslinked SBS undergoes one or more substitution reactions to replace the ionic functional groups introduced by the oxiranes as described above. In some embodiments, the crosslinked SBS includes halide ionic groups that are substituted via a nucleophilic substitution reaction, e.g., with an alkyltrialkylammonium such as trimethylamine, with quaternary ammonium groups. In some embodiments, at 114, an ion exchange reaction is performed, e.g., to replace halide ions with hydroxide ions to make the membrane hydroxide conductive.

Figure 2:
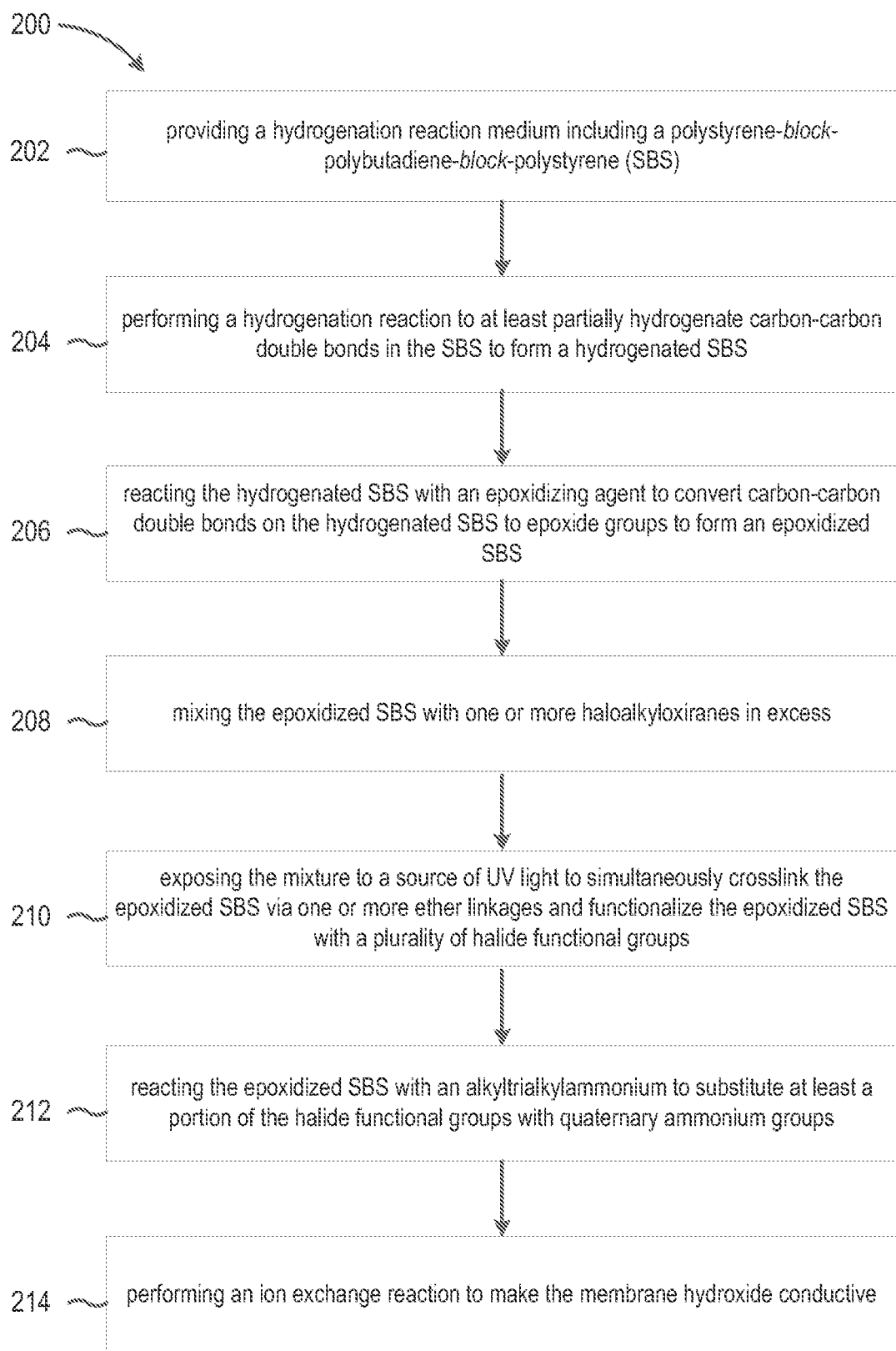
FIG. 2 is a chart of a method of making an ion exchange membrane material according to some embodiments of the present disclosure.

Referring now to FIG. 2, some embodiments of the present disclosure are directed to a method 200 of making an ion exchange membrane. At 202, a hydrogenation reaction medium is provided including SBS. At 204, a hydrogenation reaction is performed to at least partially hydrogenate carbon-carbon double bonds in the SBS to form a hydrogenated SBS. As discussed above, in some embodiments, the hydrogenation reaction removes between about 50% and about 99%; about 60% and about 95%; or about 65% and about 90% of carbon-carbon double bonds in the SBS. At 206, the hydrogenated SBS is reacted with an epoxidizing agent to convert carbon-carbon double bonds on the hydrogenated SBS to epoxide groups to form an epoxidized SBS. At 208, the epoxidized SBS is mixed with one or more haloalkyloxiranes in excess. At 210, the mixture is exposed to a source of UV light to simultaneously crosslink the epoxidized SBS via one or more ether linkages and functionalize the epoxidized SBS with a plurality of halide functional groups. At 212, the epoxidized SBS is reacted with an alkyltrialkylammonium to substitute at least a portion of the halide functional groups with quaternary ammonium groups. At 214, an ion exchange reaction is performed to make the membrane hydroxide conductive.

Figure 3:
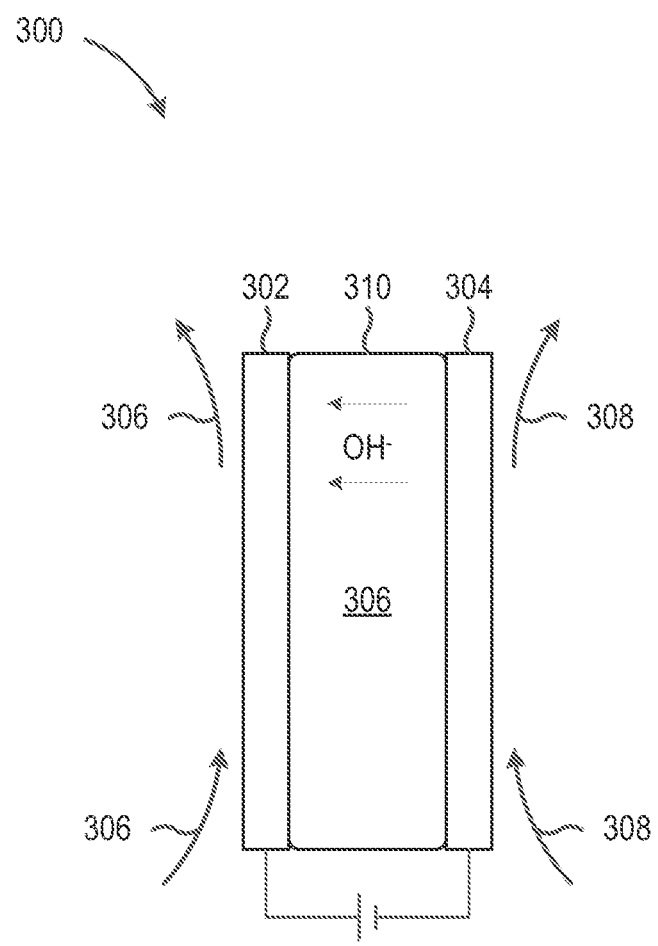
FIG. 3 is a schematic drawing of an electrochemical energy conversion system including an ion exchange membrane according to some embodiments of the present disclosure.

Referring now to FIG. 3, in some embodiments, the ion exchange membrane material is incorporated into an electrochemical energy conversion system 300. In some embodiments, system 300 includes an anode 302, a cathode 304, and an electrolyte 306 disposed between the anode and the cathode. System 300 is suitable for use in numerous applications, such as fuel cells, energy recovery ventilation systems, water electrolysis systems, electrochemical hydrogen compressors, batteries, sensors, actuators, etc. In some embodiments, anode 302 and cathode 304 are composed of any suitable material for use with electrolyte 306 in system 300. In some embodiments, system 300 includes any inlets/outlets 308 to supply reactants to and remove reaction products from anode 302, cathode 304, and electrolyte 306. In some embodiments, system 300 includes a catalyst layer (not pictured).

In some embodiments, electrolyte 306 includes a solid electrolyte. In some embodiments, electrolyte 306 includes ion exchange membrane 310 including the ion exchange membrane material consistent with the embodiments discussed above. In some embodiments, ion exchange membrane 310 is an anion exchange membrane.

EXAMPLES

The extent of partial hydrogenation reaction of unmodified SBS was controlled by the equivalence of 4-methylbenzenesulfonohydrazide to the carbon-carbon double bond on SBS backbone. Subsequently, remaining double bonds were converted to epoxide groups by reacting with 3-chloroperoxybenzoic acid. In this way, epoxidized SBS (E-SBS) was prepared with 10 mol %, 16 mol %, 20 mol %, 25 mol %, and 30 mol % carbon-carbon doubles being converted to epoxide. Those polymers were named as E-SBS-y, where y represented the conversion of double bonds to epoxide.

Figure 4:
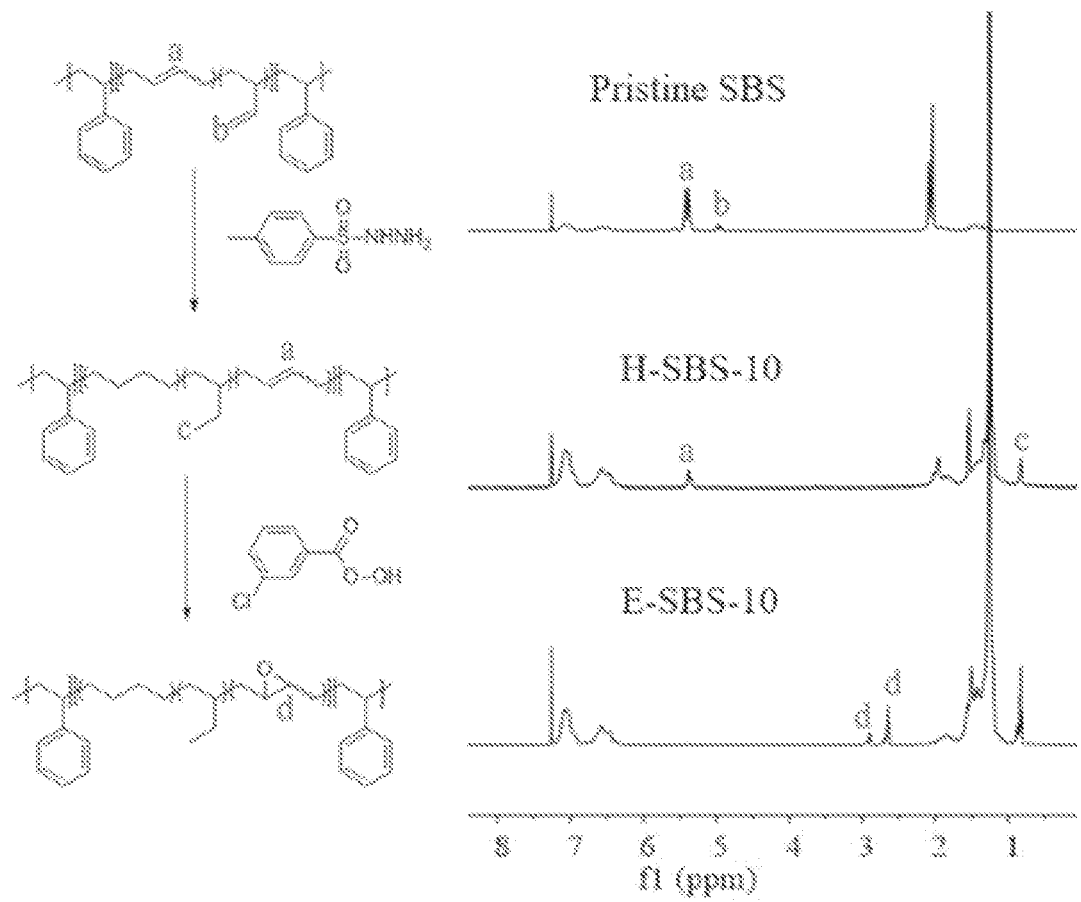
FIG. 4 shows nuclear magnetic resonance (NMR) spectra of polystyrene-b-polybutadiene-b-polystyrene (SBS) triblock copolymers according to some embodiments of the present disclosure.
Figure 5:
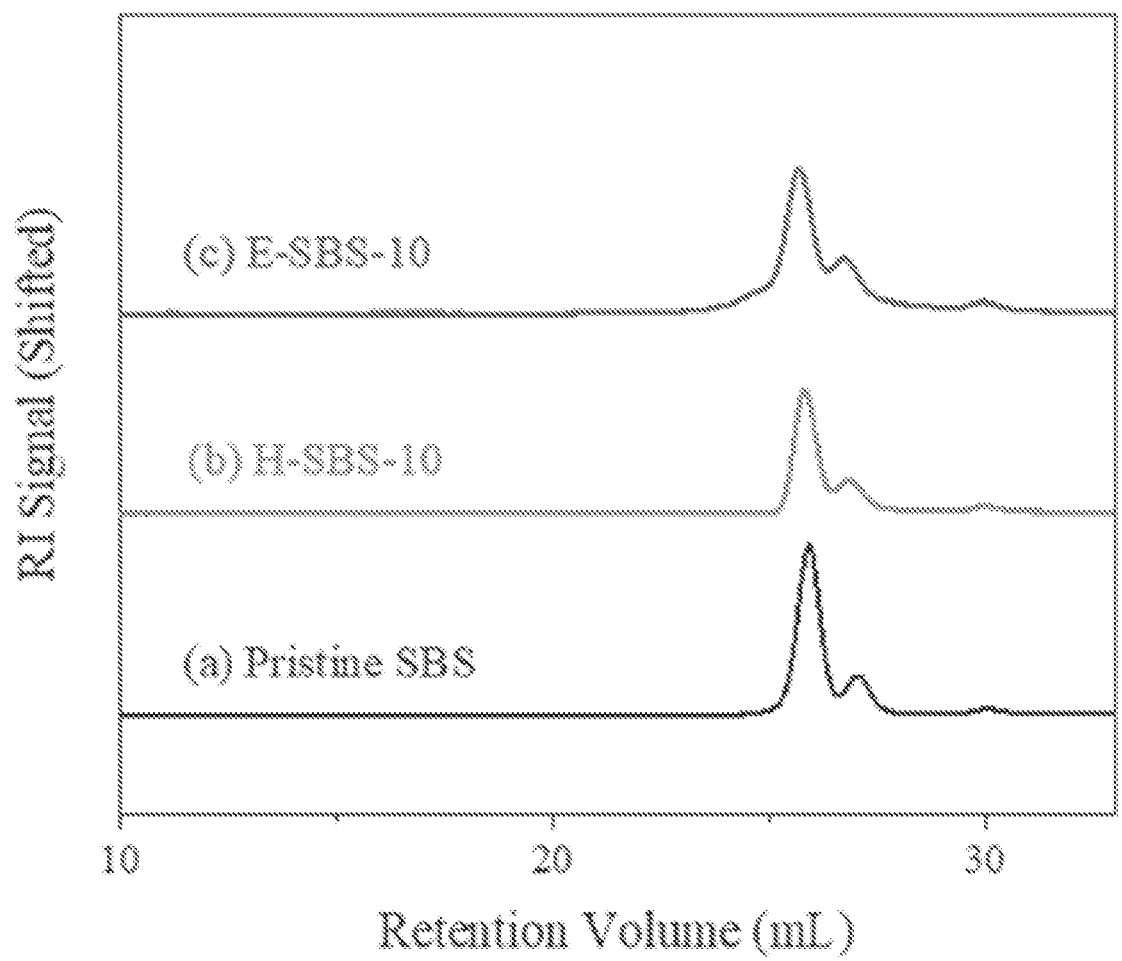
FIG. 5 shows gel permeation chromatography curves of epoxidized SBS triblock copolymers according to some embodiments of the present disclosure.

The synthesis of E-SBS was characterized by NMR and GPC. Formation of crosslinked membranes through epoxide ring-opening reaction was proofed by FTIR and DSC. FIG. 4 shows the NMR spectra using the synthesis of E-SBS-10 as an example. The proton signals of vinyl groups (peak a and b) became less intense after partial hydrogenation reaction. Then, peak d corresponding epoxide rings emerged, and vinyl proton signal completely disappeared for E-SBS-10. Without wishing to be bound by theory, the two positions of peak d were due to the existence of stereocenter within the epoxide group. The agreement of integral area of peak a of H-SBS-10 and peak d of E-SBS-10 indicated that the epoxidation reaction was complete. GPC results in FIG. 5 showed no obvious polymer chain crosslinking or scission happening during the partial hydrogenation and epoxidation reactions, as both molecular weight and polydispersity index were preserved.

Figure 6:
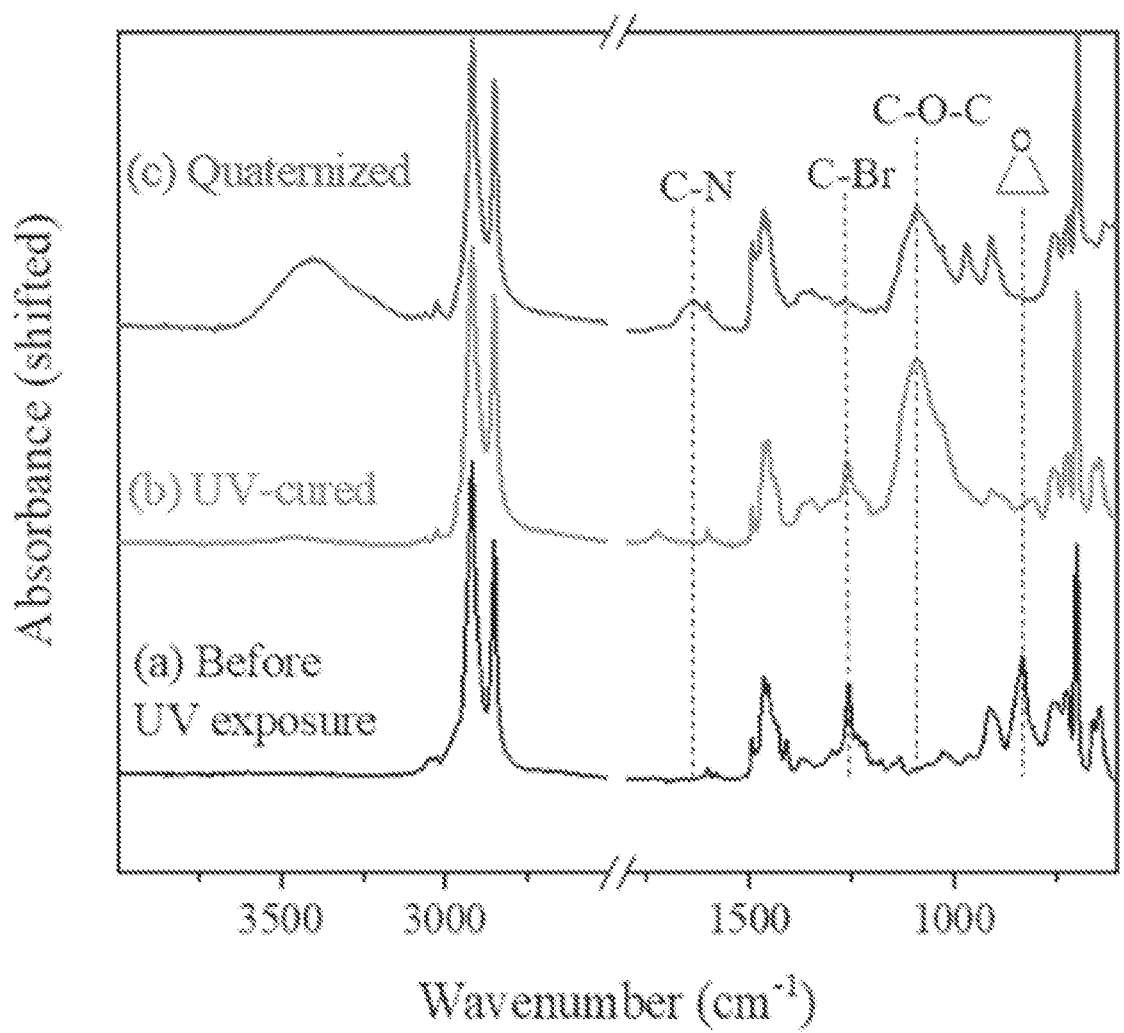
FIG. 6 shows Fourier-transform infrared spectroscopy spectra of epoxidized SBS triblock copolymers according to some embodiments of the present disclosure.

The epoxide ring-opening reaction and subsequent quaternization reaction were successfully confirmed by FT-IR. As shown in FIG. 6, a strong peak representing epoxide ring existed around 800 $cm^{-1}$ for the as-cast membrane without any UV exposure. After UV curing, the peak at 800 $cm^{-1}$ disappeared and a new peak from linear C—O bond showed up at 1100 $cm^{-1}$, which indicated the occurrence of epoxide ring-opening. After quaternization reaction with trimethylamine, C—Br stretching peak at 1260 $cm^{-1}$ no longer existed, and C—N peak emerged at 1600 $cm^{-1}$, which implied that bromine groups were completely replaced by quaternary ammonium ionic groups. Additionally, a broad peak of O—H can be observed at 3300 $cm^{-1}$.

Figure 7:
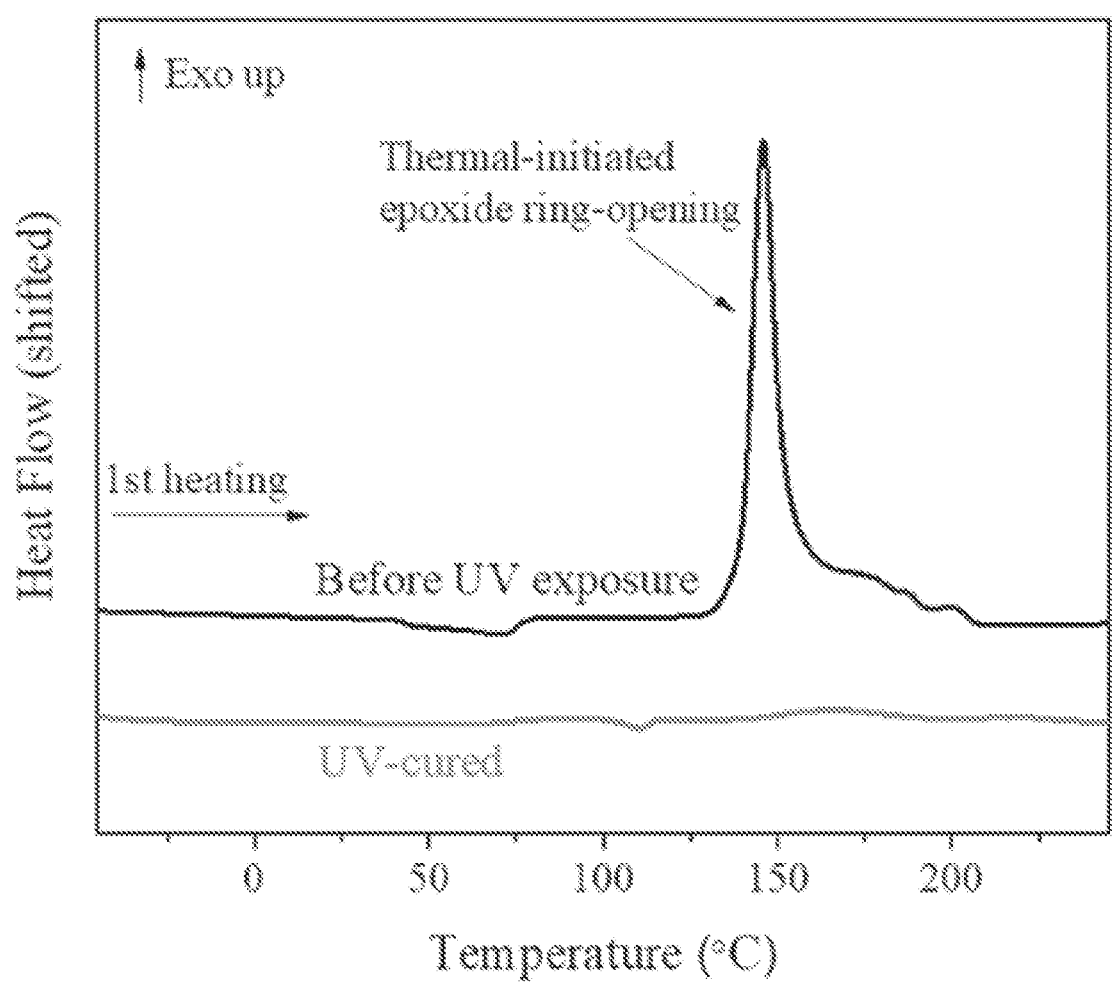
FIG. 7 shows differential scanning calorimetry curves of epoxidized SBS triblock copolymers according to some embodiments of the present disclosure.

Referring now to FIG. 7, the epoxide ring-opening reaction was further characterized by differential scanning calorimetry (DSC). Since the onium salt-based catalyst can also undergo thermal decomposition and generate superacid catalyst as well, a strong peak was observed at 150° C. for the membrane without UV exposure. Without wishing to be bound by theory, the strong exothermic peak was a result of strain release of three-membered epoxide ring. However, this peak was no longer seen in the DSC heating curve of the UV-cured membrane, which meant that almost all the epoxide rings were opened under UV condition. Therefore, UV-initiated ring-opening reaction was quite efficient for relatively thin membranes (around 60 μm).

The oligomers formed by self-polymerization of haloalkyloxirane are removable by extraction with chloroform. By adding more haloalkyloxiranes, it enabled introduction of more ionic functional groups to the crosslinked polymer while also generated more oligomers and reducing the degree of crosslinking.

The IEC of the crosslinked AEM was tested using Mohr titration method with potassium chromate as indicator. The IEC initially increased as the mole ratio of epoxide to haloalkyloxirane for E-SBS-10 increased up to 1:7.5, then a plateau was observed for higher haloalkyloxirane loading. It was apparent that E-SBS-10 could uptake more alkyl bromide when the amount of haloalkyloxirane was increased to some extent. The reaction was competitive and the final IEC was limited by the total amount of epoxide groups. In other words, it was difficult to introduce more alkyl bromide if all the epoxide rings on SBS were opened and reacted. Additionally, the in-situ generated superacid catalyst could be quenched quickly in the ambient condition, which also restricted the extent of the reaction. To overcome the upper limit of IEC using E-SBS-10, a series of SBS with higher epoxide content, E-SBS-16, E-SBS-20, E-SBS-25, E-SBS-30, were prepared and employed. It was founded that E-SBS-30 produced heavily-crosslinked membrane which was quite brittle to work with. However, E-SBS-20, E-SBS-25, and E-SBS-30 indeed further improved the IEC and the resulting ion conductivity property of the membrane, as shown in Table 1.

TABLE 1

AEM properties of SBS-based crosslinked membrane.

| Sample[a] | Titrated IEC[b] (mmol/g) | WU[c] (wt. %) | In-plane swelling[d] (%) | $\lambda^e$ | $Cl^-$ σ (mS/cm) 80° C. | $H^-$ σ (mS/cm) 30° C. | 60° C. | 80° C. |
|---|---|---|---|---|---|---|---|---|
| X-SBS-10_1.02 | 1.02 | 33 | 8 | 18 | 19 | 20 | 28 | 47 |
| X-SBS-10_1.27 | 1.27 | 67 | 12 | 30 | 27 | 25 | 47 | 63 |
| X-SBS-10_1.50 | 1.50 | 93 | 20 | 34 | 31 | 39 | 65 | 82 |

TABLE 1-continued

AEM properties of SBS-based crosslinked membrane.

| Sample[a] | Titrated IEC[b] (mmol/g) | WU[c] (wt. %) | In-plane swelling[d] (%) | $\lambda^e$ | Cl⁻ σ (mS/cm) 80° C. | H⁻ σ (mS/cm) 30° C. | 60° C. | 80° C. |
|---|---|---|---|---|---|---|---|---|
| X-SBS-16_2.21 | 2.21 | 183 | 34 | 46 | 35 | 32 | 61 | 85 |
| X-SBS-20_2.46 | 2.46 | 175 | 35 | 40 | 35 | 38 | 64 | 90 |
| X-SBS-25_2.69 | 2.69 | 147 | 40 | 30 | 43 | 35 | 62 | 98 |

[a]X-SBS-y_z, where y indicated the degree of functionalization of epoxide SBS used for membrane preparation, and z indicates the IEC of the membrane.
[b]Titrated IEC values were obtained from an average of two Mohr titration measurements.
[c]Water uptake values were obtained from an average of two measurements at room temperature using membrane in hydroxide form.
[d]In-plane swelling ratio values were obtained from an average of two measurements at room temperature using membrane in hydroxide form.
[e]Hydration number were calculated using membrane in hydroxide form at room temperature.

In order to improve the efficiency of an exemplary fuel cell, the membrane should exhibit hydroxide conductivity (>60 mS/cm) under operating condition (80° C.). The conductivity of membranes according to embodiments of the invention was tested by a four-probe conductivity cell at 100% relative humidity with varying temperatures. Table 1 showed that membranes with higher IEC exhibited higher conductivity at the same temperature, since it had more ionic groups help transport the hydroxide anion. Moreover, the membrane with the same IEC showed better conductivity at higher temperature, due to the increased kinetic energy of the hydroxide ion. The highest conductivity 98 mS/cm was achieved at 80° C. and 100% relative humidity from the membrane with IEC as 2.69 mmol/g.

Figure 8:
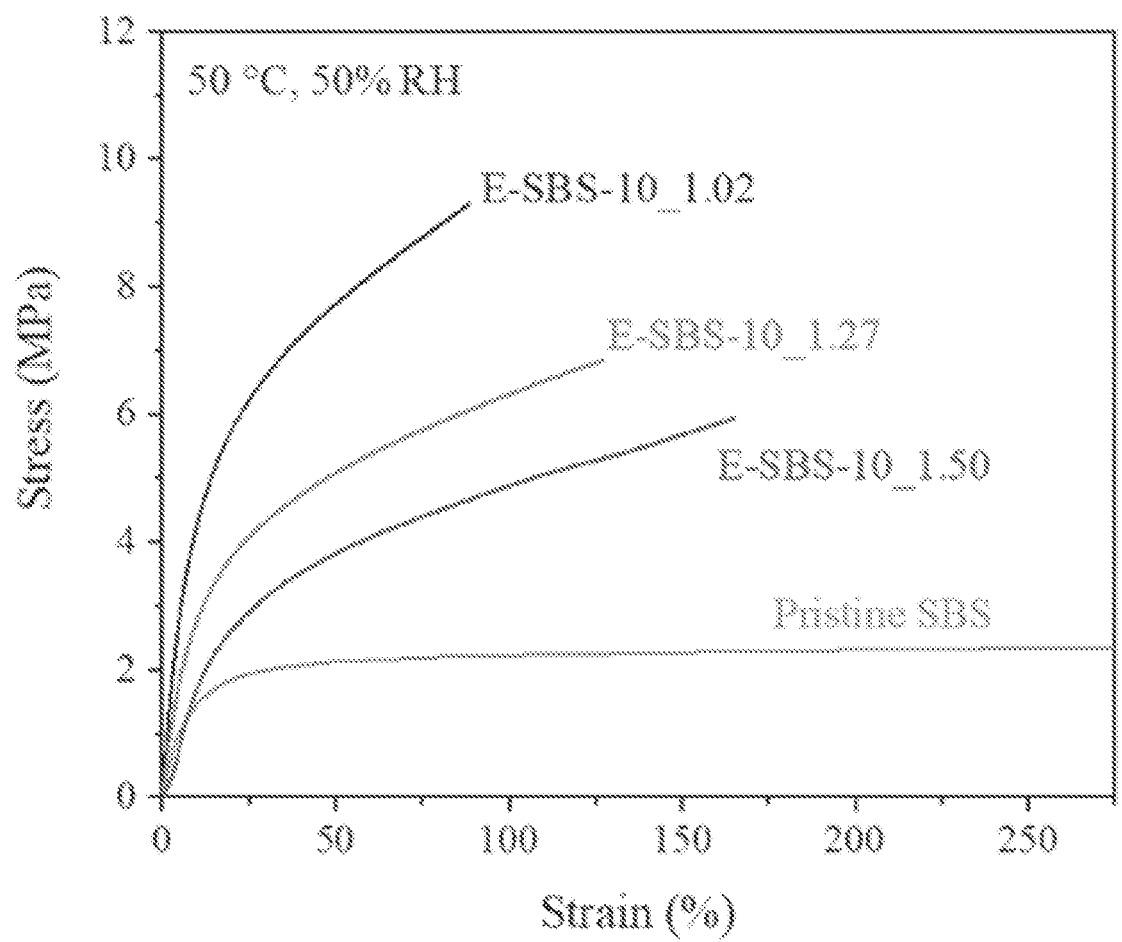
FIG. 8 shows stress-strain curves of epoxidized SBS triblock copolymers according to some embodiments of the present disclosure.

The mechanical stability of the membranes was characterized by tensile test using dynamic mechanical analysis (DMA). To mimic the real operating condition of fuel cell, FIG. 8 showed the stress-strain curve at 50° C. and 50% RH. The tensile strength of all crosslinked membrane improved significantly compared to the unmodified SBS, which was ascribed to the successful polymer backbone crosslinking. Elongation at break larger than 100% was maintained for all the membranes, which meant that the crosslinked membranes according to embodiments of the present invention still had reasonable flexibility. There were only a few portions of double bonds on SBS being converted to epoxide ring, so the degree of crosslinking was controlled to a relatively low level to avoid reduce brittleness.

Figure 9:
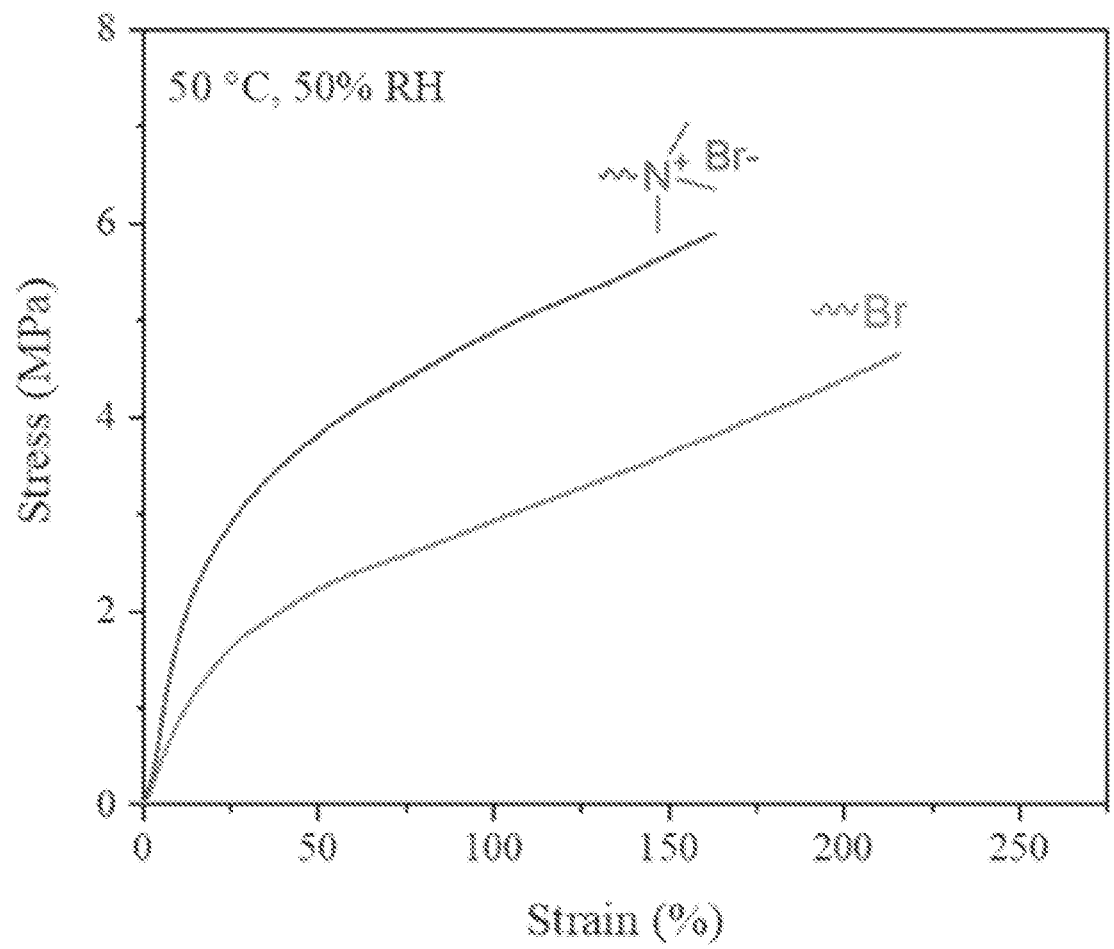
FIG. 9 shows stress-strain curves of epoxidized SBS triblock copolymers according to some embodiments of the present disclosure.
Figure 10:
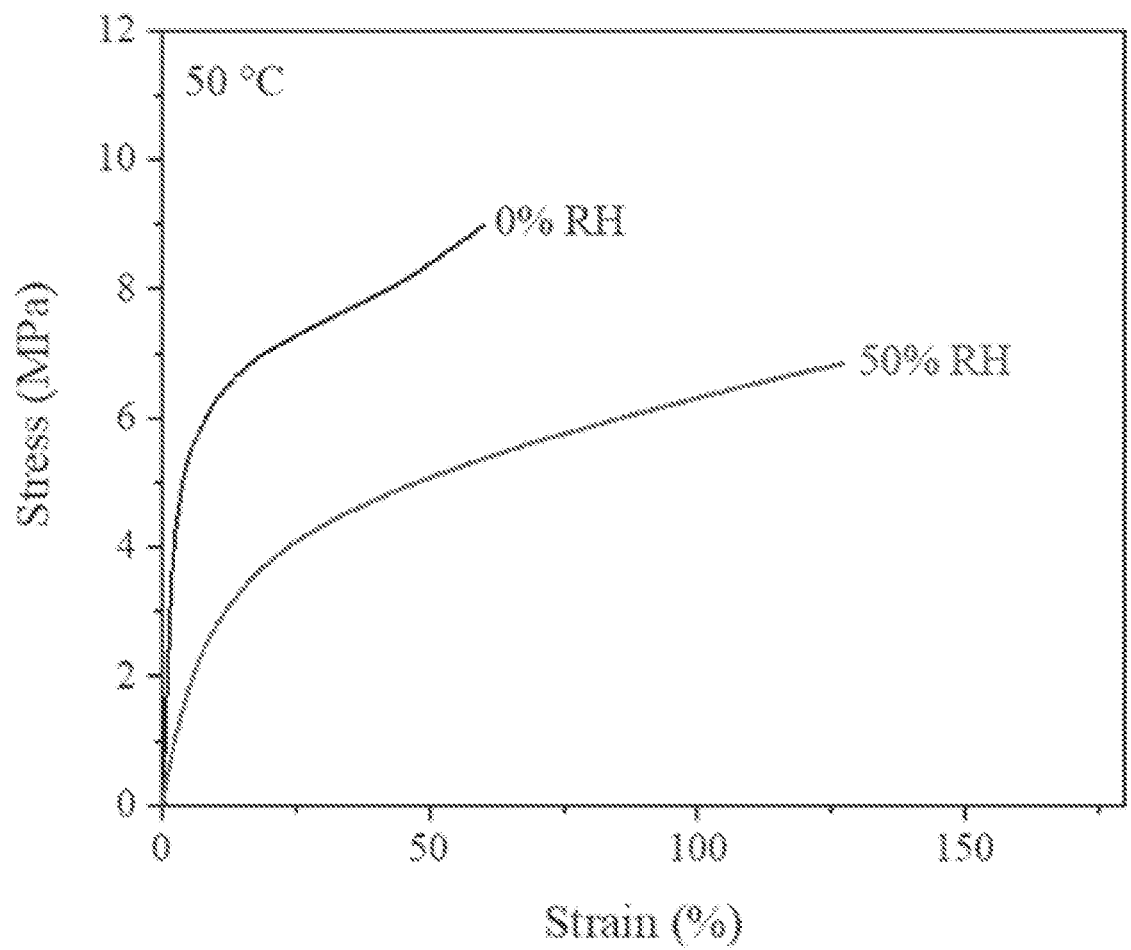
FIG. 10 shows stress-strain curves of epoxidized SBS triblock copolymers according to some embodiments of the present disclosure.

The membrane with higher IEC was more stretchable. Since the IEC was controlled by the feed ratio of haloalkyloxirane and SBS. Without wishing to be bound by theory, with less haloalkyloxirane added, the epoxide ring on the polymer backbone has more chance to react with another epoxide on the polymer backbone, undergoing crosslinking reaction. To the contrary, the epoxide ring on the polymer will likely react with epoxide on haloalkyloxirane if added in large excess, undergoing post-functionalization reactions. Membrane with higher IEC has less dense crosslinked network, and vice versa, due to the nature of those competing reactions. It was also found that the membrane became a little bit more brittle after quaternization reaction, as shown in FIG. 9. The change was mainly because of the static interaction between ionic groups. Moreover, the mechanical property was affected by relative humidity. FIG. 10 indicated that membrane became more elastic under 50% RH compared to anhydrous condition, because the membrane possessed hydrophilic ionic groups, the absorbed water under humidified condition can act as plasticizer and weaken the static interaction between ionic groups, rendering more flexible membranes.

Methods and systems of the present disclosure include crosslinked ion exchange membranes prepared through an efficient and convenient UV-initiated epoxide ring-opening reaction. The membrane properties can be tuned by the degree of epoxidized SBS as well as the amount of available haloalkyloxiranes. The photoacid generator present in the ring-opening reaction advantageously decomposes and generates superacid, which in turn then acts as a catalyst for polymerization. The degree of crosslinking and IEC can be controlled by the feed ratio of epoxidized SBS and haloalkyloxiranes, as well as the concentration of epoxide on SBS. The resulting crosslinked AEMs showed mechanical strength improvement of 200% compared to unmodified SBS, while elongation at break was still more than 150%. The membranes exhibited hydroxide conductivity up to 98 mS/cm at 80° C. under 100% relative humidity. The synthetic pathways described herein are fast and tunable, providing a low-cost synthetic method for AEM in electrochemical energy conversion systems such as fuel cells.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A material comprising:
   a polymer according to Formula I:

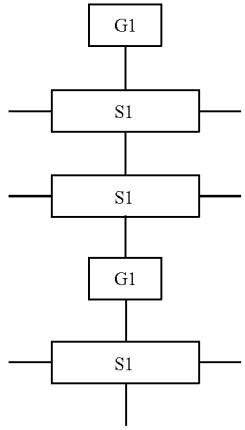

(Formula I)

wherein S1 is an epoxidized polystyrene-block-polybutadiene-block-polystyrene triblock copolymer and G1 includes one or more alkylated substrates,
wherein the S1-S1 linkage is one or more ether linkages,
wherein the one or more alkylated substrates are joined by ether linkages, and
wherein the alkylated substrates include a hydrocarbyl group and one or more ionic groups.

2. The material according to claim 1, wherein the alkylated substrate includes one or more quaternary ammonium groups, one or more multication hydrocarbyl groups, one or more halide groups, or combinations thereof.

3. The material according to claim 2, wherein the alkylated substrate includes Formula II:

Formula (II)

wherein $R_2$ is a hydrocarbyl group, n=1 to about 10; and X includes hydroxide, one or more halides, or combinations thereof.

4. The material according to claim 3, wherein the polymer includes the structure according to Formula III:

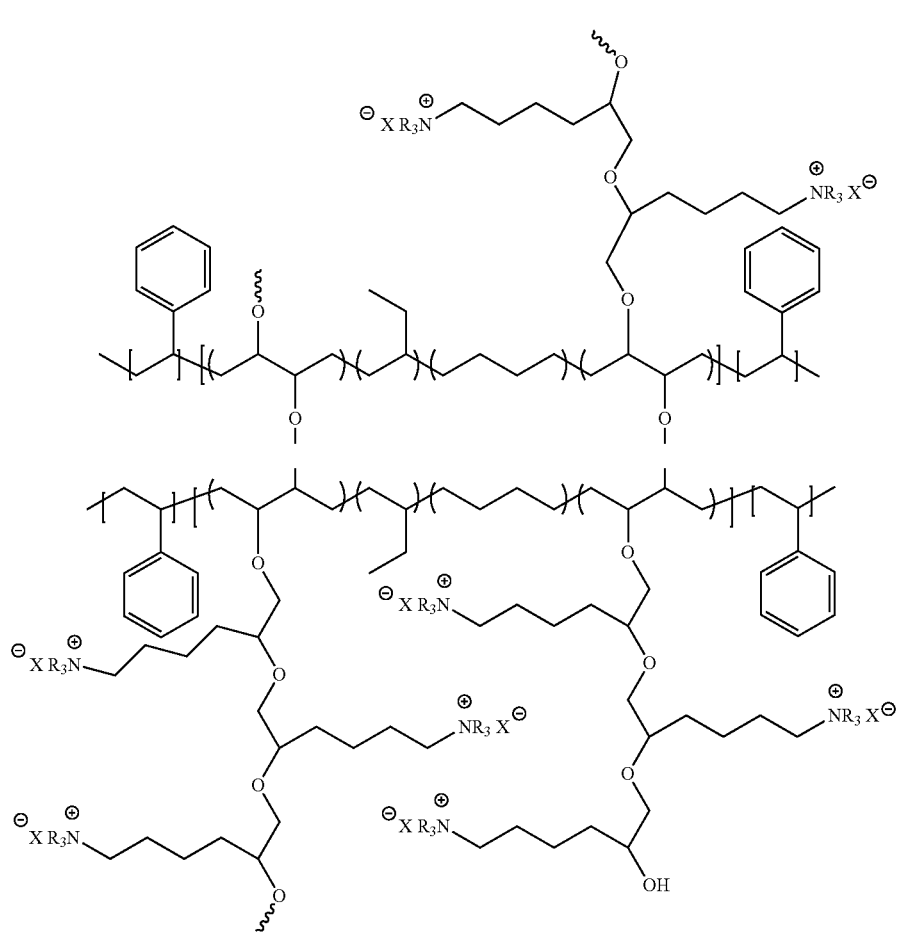

(Formula III)

wherein R is a methyl group and X is a hydroxide.

5. A method of making according to claim 1 material, comprising:
providing a hydrogenation reaction medium including polystyrene-block-polybutadiene-block-polystyrene (SBS);
performing a hydrogenation reaction to hydrogenate carbon-carbon double bonds in the SBS to form a hydrogenated SBS;
reacting the hydrogenated SBS with an epoxidizing agent to convert carbon-carbon double bonds to epoxide groups on the hydrogenated SBS to form an epoxidized SBS;
mixing the epoxidized SBS with one or more oxiranes, the one or more oxiranes substituted with one or more ionic functional groups; and
exposing the mixture to a source of UV light to form a crosslinked SBS.

6. The method according to claim 5, wherein the hydrogenation reaction medium further comprises 4-methylbenzenesulfonohydrazide and tripropylamine.

7. The method according to claim 5, wherein the hydrogenation reaction removes between about 65% and about 90% of carbon-carbon double bonds in the SBS.

8. The method according to claim 5, wherein the epoxidizing agent includes a peracid, a peroxide, a peroxymonosulfuric acid, or combinations thereof.

9. The method according to claim 8, wherein the epoxidizing agent includes hydrogen peroxide, 3-chloroperoxybenzoic acid, potassium peroxymonosulfate, or combinations thereof.

10. The method according to claim 5, wherein the one or more ionic functional groups include one or more quaternary ammonium groups, one or more hydrocarbyl groups, one or more halide groups, or combinations thereof.

11. The method according to claim 5, further comprising reacting the crosslinked SBS with an alkyltrialkylammonium to include a quaternary ammonium group in at least a portion of the crosslinked SBS.

12. The method according to claim 11, further comprising performing an ion exchange reaction to make the membrane hydroxide conductive.

13. The method according to claim 10, wherein the material includes a polymer according to Formula I:

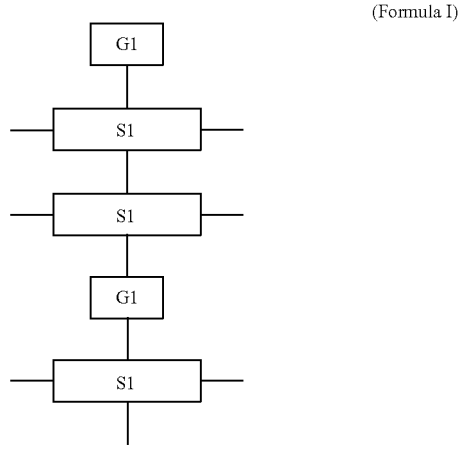

(Formula I)

wherein S1 is an epoxidized polystyrene-block-polybutadiene-block-polystyrene triblock copolymer and G1 includes one or more alkylated substrates, wherein the S1-S1 linkage is one or more ether linkages, wherein the one or more alkylated substrates are joined by ether linkages, and wherein the alkylated substrates include a hydrocarbyl group and one or more ionic groups.

14. The method according to claim 13, wherein the alkylated substrate includes one or more quaternary ammonium groups, one or more multication hydrocarbyl groups, one or more halide groups, or combinations thereof.

15. The method according to claim 14, wherein the alkylated substrate includes Formula II:

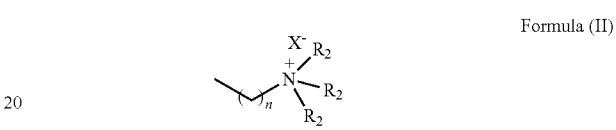

Formula (II)

wherein $R_2$ is a hydrocarbyl group, n=1 to about 10; and X includes hydroxide, one or more halides, or combinations thereof.

16. The method according to claim 15, wherein the polymer includes the structure according to Formula III:

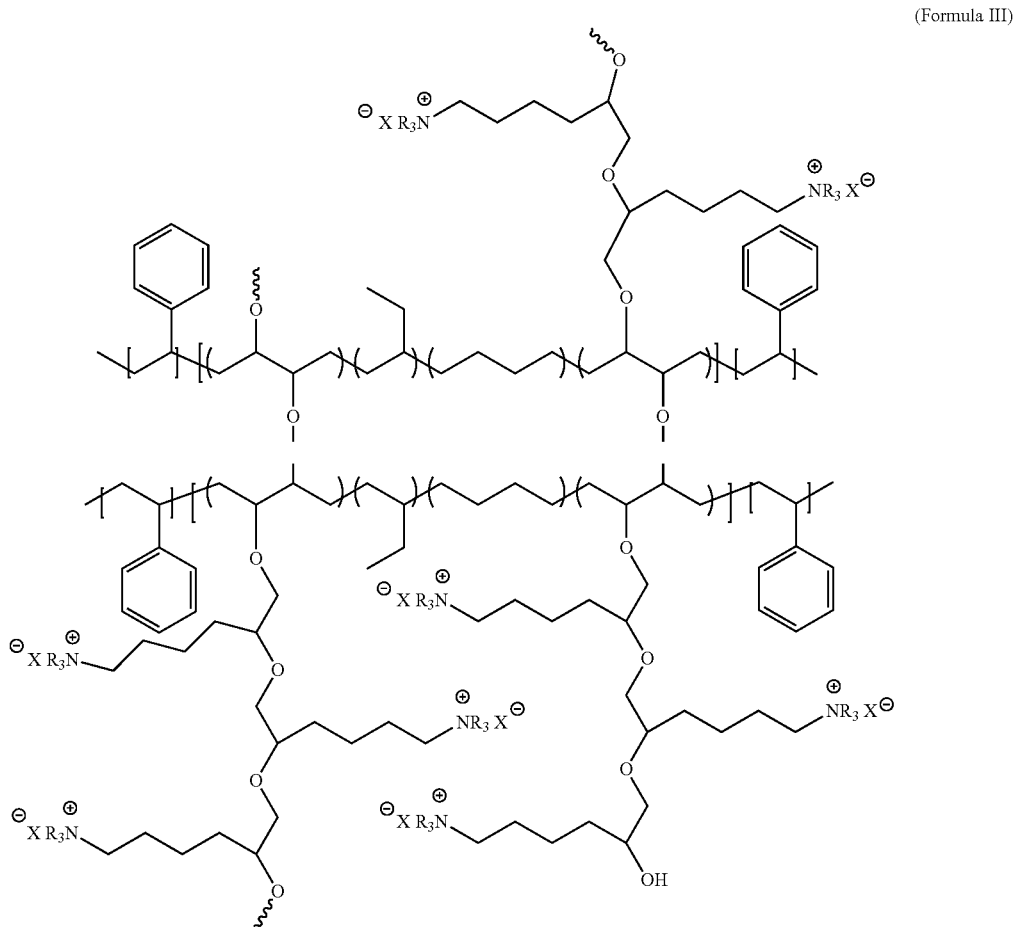

(Formula III)

wherein R is a methyl group and X is a hydroxide.

17. The method of making the material according to claim 5, further comprising:
- exposing the mixture to a source of UV light to simultaneously crosslink the epoxidized SBS via one or more ether linkages and functionalize the epoxidized SBS with a plurality of halide functional groups;
- reacting the epoxidized SBS with an alkyltrialkylammonium to substitute halide functional groups with quaternary ammonium groups; and
- performing an ion exchange reaction to make the membrane hydroxide conductive.

18. The method according to claim 17, wherein the hydrogenation reaction removes between about 65% and about 90% of carbon-carbon double bonds in the SBS.

19. The method according to claim 17, wherein the epoxidizing agent includes hydrogen peroxide, 3-chloroperoxybenzoic acid, potassium peroxymonosulfate, or combinations thereof.

20. The method according to claim 17, wherein the polymer includes the structure according to Formula III:

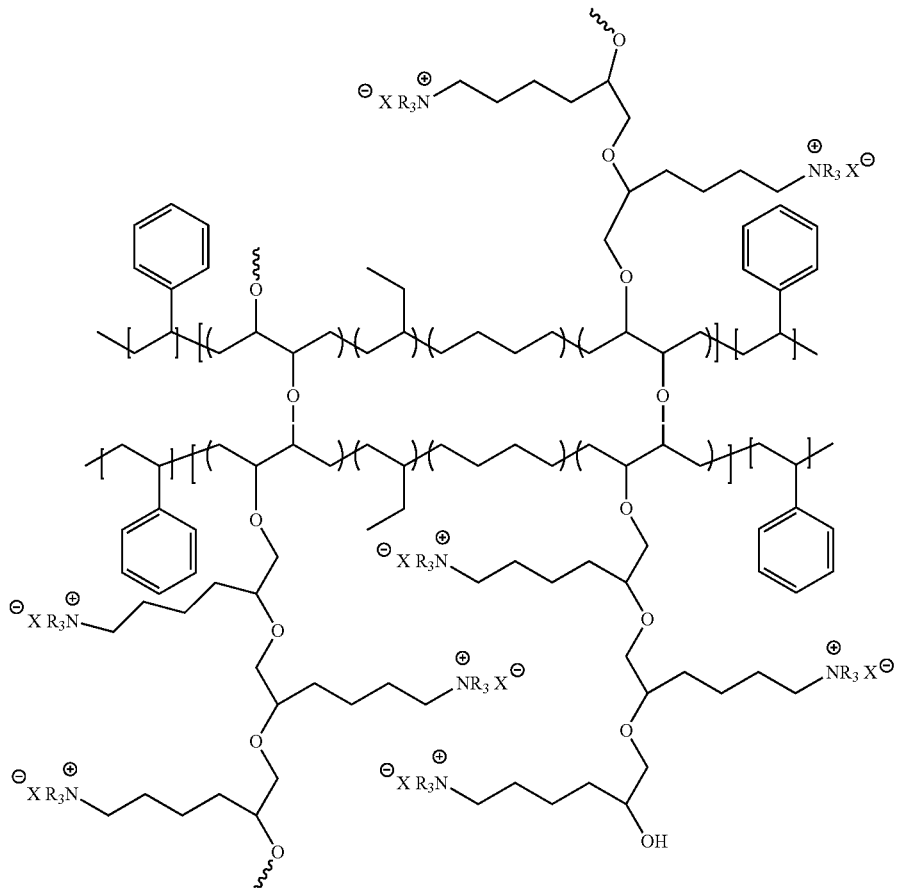

(Formula III)

wherein R is a methyl group and X is a hydroxide.

* * * * *